June 21, 1966 A. GOERG 3,257,165
CONTINUOUS METHOD FOR THE PURIFICATION OF BRINE
Filed Feb. 19, 1963 3 Sheets-Sheet 2

FIG 2

INVENTOR
Alfred Goerg
by Wenderoth, Lind & Ponack
ATTORNEYS

June 21, 1966  A. GOERG  3,257,165
CONTINUOUS METHOD FOR THE PURIFICATION OF BRINE
Filed Feb. 19, 1963  3 Sheets-Sheet 3

FIG 3

INVENTOR.
Alfred Goerg
by Wenderoth, Lind + Ponack
ATTORNEYS

United States Patent Office 3,257,165
Patented June 21, 1966

3,257,165
CONTINUOUS METHOD FOR THE PURIFICATION
OF BRINE
Alfred Goerg, Blonay, Switzerland, assignor to Ciba
Limited, Basel, Switzerland, a Swiss company
Filed Feb. 19, 1963, Ser. No. 261,936
Claims priority, application Switzerland, May 15, 1959,
73,255/59; Apr. 8, 1960, 4,028/60
10 Claims. (Cl. 23—42)

This is a continuation-in-part of my application Serial No. 29,076 filed May 13, 1960, now abandoned.

This invention provides a process and apparatus for the purification of brine by the addition of lime and alkali carbonate to precipitate calcium and magnesium and at least a part of the sulfate ions present in sodium chloride or potassium chloride brines.

Such impurities must be removed from the brine before it is further treated, for example, before it is concentrated by evaporation or before a sodium chloride brine is subjected to electrolysis. The undesirable impurities are especially magnesium, calcium and sulfate ions, which are present in varying proportions depending on the origin of the brine. Various processes are known for removing such impurities. Thus, in one process calcium and magnesium are precipitated by the addition of slaked lime to the cold brine and the subsequent addition of sodium carbonate. In another process sodium sulfate, if desired, in the form of mother liquor from the concentration apparatus, is first added to the cold brine, and then slaked lime is added. In this manner magnesium is precipitated in the form of magnesium hydroxide and a part of the calcium in the form of calcium sulfate. When the precipitate has settled, the brine is separated by decantation, and sodium carbonate is added to precipitate the remaining calcium in the form of the carbonate. Magnesium hydroxide is precipitated as a very finely divided, voluminous and adherent substance, so that a very long time is required for it to settle in the brine. For this reason very large settling tanks are required for the process. For example, with a brine rich in magnesium (approximately 1.9 gram of Mg per liter) and a daily throughput of 100 cubic meters, for settling tanks each having a capacity of at least 300 cubic meters are required. Of these tanks two are provided for the settling of magnesium and two for the settling of the calcium sludge. The containers are alternately filled and emptied after the settling. Due to the nature of the material it is not possible to separate it by filtration, instead of by gravity settling. Moreover, the magnesium hydroxide settles out in a very voluminous form, so that, for example, in the above arrangement the deposit will contain, after the brine has been poured off, at least 8 to 12% of brine. The recovery of at least a portion of this brine requires more settling vessels or tanks. The removal of the magnesium hydroxide sludge from the settling tanks is a troublesome and costly operation, which must in general be carried out by hand. The known processes therefore require a great deal of space, extensive installations and much labor, and result in an appreciable loss of brine. They are in general discontinuous in operation, since continuous operation would involve complicated and expensive apparatus.

The present invention provides a process for the purification of brine by the addition thereto of lime and alkali carbonate, wherein the lime is added continuously to the hot upward-flowing brine, while stirring moderately, in a first reaction zone at such a rate that the brine leaving this zone has a pH value of at least 10.0, a part of the precipitated sludge is maintained in contact with the brine in the reaction zone, and the velocity of flow of the brine decreases on account of upwardly widening cross section of the brine and is such that the brine does not carry any sludge along with it.

In general, alkali carbonate is then added continuously in a second reaction zone, following the first one, until an excess of alkali carbonate can be detected, the velocity of flow in the settling zone associated with the second zone being such that the sludge then precipitated is not carried along with the brine.

The decisive features of the present invention are that the brine flows upwardly, that the velocity of the flowing brine decreases on account of the cross section which widens upwardly and that the lime is continuously added in countercurrent so that the precipitated sludge falls down.

The lime is added as slaked lime or, preferably, as granulated burnt lime or instead of this as lime-milk, i.e., a suspension of 10 to 40 percent by weight of $Ca(OH)_2$ in water or in brine.

The amount of added lime is so choosen that in the first zone there is a uniform increase of pH value from 7.0 to at least 10.0. In certain circumstances it may be of advantage to allow the pH value to rise to 12 or higher. This can be achieved in various ways, for example, by the use of burnt lime of very fine particle size, by the addition of pulverized slaked lime to the burnt lime or by the use of lime-milk. In general the process is carried out in such manner that the precipitated sludge collects in a settling zone underneath or in front of the reaction zone, and the removal of the deposited sludge is carried out at a rate such that there is always sufficient sludge available for mixing with the freshly supplied brine, but that no sludge is carried along with the brine out of the reaction zone. The brine to be purified is fed in at the beginning of the reaction zone in such manner that it immediately mixes well with the sludge.

The flow of the brine in countercurrent to the added lime and the precipitated sludge is achieved by carrying out the reaction in a vertical vessel in which the brine ascends. In order to obtain a decrease of the velocity of the brine the vessel has a conical form. The cross section is small on the bottom of the vessel and increases up to the place where the lime is added.

It is of advantage to add sodium sulfate to the brine within the first reaction zone, or at any rate before it reaches the second zone, and the sodium sulfate may be used in form of the mother liquor obtained from the concentration of the brine by evaporation. In the second zone there is added alkali carbonate, preferably a sodium carbonate. The expression alkali carbonate involves alkali carbonate, alkali hydrogen carbonate (alkali bicarbonate) and carbon dioxide. The alkali bicarbonate may be added simultaneously with the alkali carbonate, or shortly before the addition of the latter, so that, for example, a hydroxyl ion concentration of at least $10^{-6}$ remains in the brine. If cleaned flue gases ($CO_2$) are available, they can be used instead of the sodium bicarbonate, but in that case it is not possible to carry out the two precipitations, as described below, one above the other in a single vessel. In that case the second reaction zone can be so dimensioned that the brine remains in the reaction zone for a certain time after it has acquired a detectable excess of alkali carbonate.

The temperature of the brine during the reaction is, for example, 50° C. to 100° C., and preferably 80° C. to 100° C. In accordance with the invention, a part of the deposited sludge is maintained in contact in the reaction zone with the incoming fresh brine so as to ensure adequate mixing of the sludge with the brine. This can be achieved in a very simple manner by drawing off a suitable volume of the deposited sludge. Advantageously, a suspension of at least 10 to not more than 60% by volume of sludge, and preferably 30 to 50% by volume, remains in the reaction zone. If this quantity of sludge is allowed to settle whilst the inflow of brine is stopped, the deposited sludge will reach a level above that of the brine inlet. The content of sludge is determined in a test portion withdrawn and the volume of the settled sludge is read off after one hour.

Both reaction zones are preferably contained in the same vessel, the second zone being above the first zone. The vessel may be so designed that the two zones are situated a certain distance apart. The velocity at which the brine ascends in a reaction zone must decrease upwardly. The velocity of flow of the brine and the intermixing of sludge and brine caused by the removal of deposited sludge are so adjusted with respect to one another that the sludge deposited in the first zone cannot enter the second zone. If both the zones are accommodated in one vessel, the sludge deposited in the second and upper zone travels through the first zone and mixes with the rather thick sludge from the first zone. This has the advantage that the sludge deposited in the settling container can be removed more easily. In some cases it may be of advantage not to accommodate the two zones within one vessel, but to carry out the precipitations in two or even in three successive vessels. When the process is performed in a single upright vessel, the vessel will be vertical and the lower part thereof will form the settling chamber for the deposited sludge. The vessel is provided with a central tube which extends within the vessel from above to below the surface of the brine, and preferably below the region of the second zone, and by means of which the lime is fed in. One or more inlets for the brine are provided in the lower part of the vessel and a discharge device for the sludge settling out in the settling chamber. If desired, the brine can also be fed in through a tube that descends into the vessel from above, for example, through the hollow shaft of the stirrer.

In order to ensure adequate mixing of the precipitated sludge, the added lime and the fresh brine it is necessary to stir the brine slowly. For this purpose a stirring device is used which also serves to scrape off any sludge that may be deposited on the walls of the vessel. The inlet for the fresh brine is advantageously located at the place where the sludge commences to settle out. In this manner the inflow of brine assists in the mixing of the sludge and brine, which is a prerequisite for the satisfactory deposition of the precipitated sludge. The mixing of sludge and brine can also be promoted either by injecting the brine under pressure downwardly or tangentially, or by feeding it in a special apparatus that assists mixing, for example, a cone or an injector. The stirring and the velocity of inflow of the brine must be so adjusted, however, that no sludge is carried out of the first reaction zone. The alkali carbonate is preferably supplied through a distributor tube which is located outside the first reaction zone and rotates with the stirring and scraping device.

In order to maintain the brine in the reaction zone at the above mentioned temperature the vessel is preferably heated.

By the process of the invention the magnesium hydroxide is precipitated in a form that settles relatively rapidly. This enables a relatively high speed of flow of the brine to be maintained without the precipitated impurities being carried out of the reaction zone, and the requirements for carrying out the process in a continuous manner to be fulfilled. It enables the residence time of the brine in the apparatus to be relatively short. By carrying out the process at a raised temperature the precipitation, especially of the magnesium hydroxide, in a rapidly settling and compact form is favored.

The precipitated substances settle out in the settling chamber in a very compact form and contain hardly any liquid. Although the sludge withdrawn from the apparatus is at first more or less liquid, depending on the method of operation, it solidifies in a short time upon standing and thus yields hardly any liquid. If the conditions given below are properly observed, the sludge will contain so little salt, in general less than 1% of the sodium chloride present in the crude brine, that washing will not be necessary.

If the brine to be purified is rich in magnesium ions, it may be of advantage to carry out the precipitation in two separate apparatuses so that the sludge produced in the first precipitation is not contaminated by calcium carbonate. In this case it is easy to recover the precipitated magnesium hydroxide from the sludge by one of the known methods. The sludge from the second vessel will then be almost pure calcium carbonate which can be washed and used as precipitated calcium carbonate.

By the addition of sodium sulfate or mother liquor, the calcium is first precipitated as sulfate, and then the residue of soluble calcium sulfate is precipitated by the addition of sodium carbonate. The addition of sodium sulfate may take the form of the return of the mother liquor obtained in the later stages of the process, for example, during the concentration by evaporation. The mother liquor is also added to the brine in the same vessel and in the same direction of flow, this addition being carried out before the sodium carbonate is added.

The addition of sodium sulfate or mother liquor is known per se, and, as compared with the method in which sodium sulfate is not used, enables sodium carbonate to be saved. If, in accordance with a method also known per se, sodium sulfate is added in excess, caustic soda is obtained which can be converted into sodium carbonate by the subsequent addition of bicarbonate or by the introduction of carbon dioxide.

The reactions that take place during the process by the addition of the reagents of the mother liquor can be represented by the following Equations 1 to 3:

If no or an insufficient amount of sodium sulfate or mother liquor is added, the calcium chloride in the second zone will also be precipitated according to the following equation:

In order to remove the caustic soda solution formed by the reaction:

bicarbonate or $CO_2$ (flue gases) may be added, if desired, which by the reaction leads to the formation of sodium carbonate and according to 3 to the further precipitation of dissolved calcium. If the brine contains iron, generally in the form of ferric chloride, it is precipitated in accordance with the following equation:

The process of the invention is illustrated with reference to the examples and the accompanying drawings in which

Figure 1:
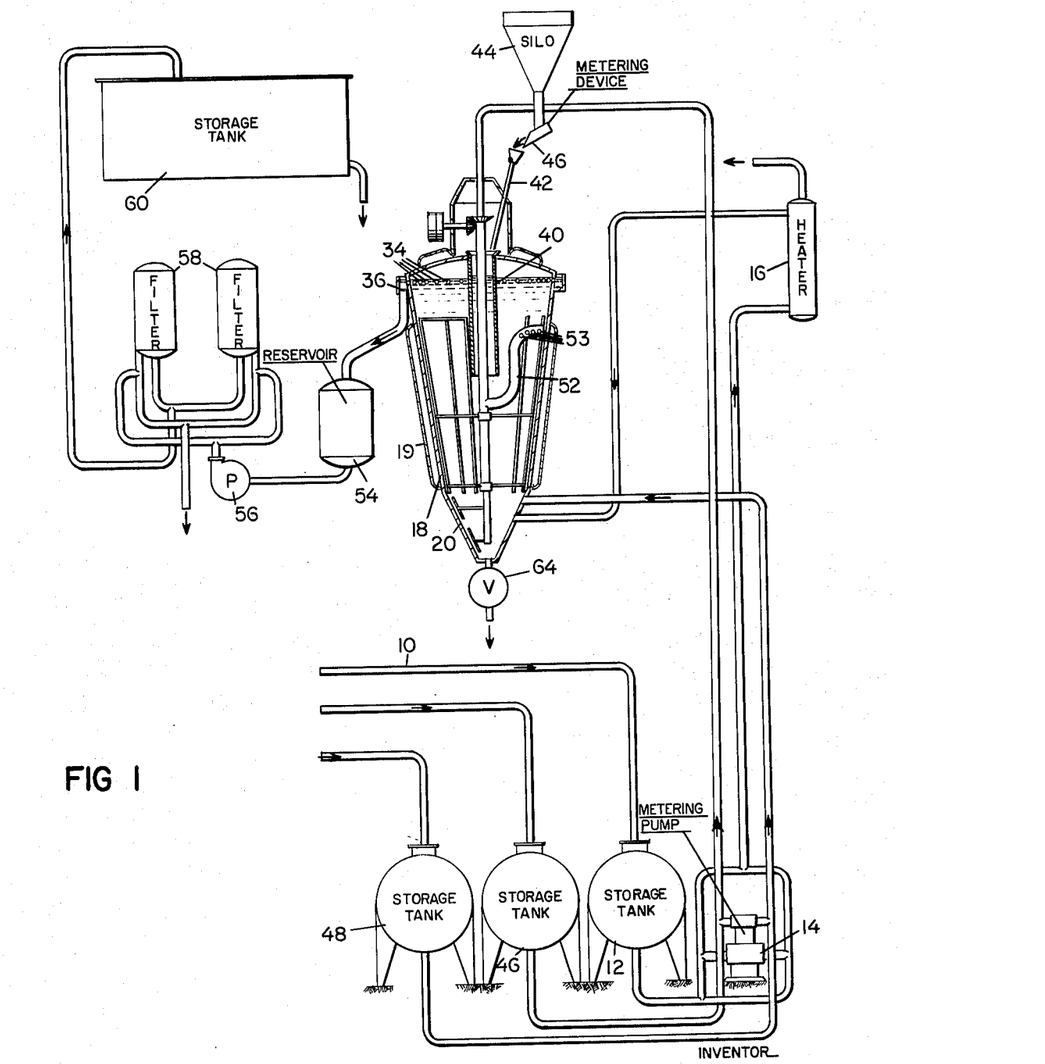
FIG. 1 shows the general arrangement of the whole plant.

FIG. 1 shows the whole apparatus used in carrying out a form of the process, in which both reaction zones are accommodated in one vessel. Brine is purified in this vessel in a continuous manner by the successive addition of granular lime, especially quicklime, and sodium carbonate solution, whereby magnesium, calcium and sulfate ions are precipitated in an easily settable form.

The brine, which comes from the salt works or like plant, flows through a pipe 10 into an intermediate tank 12. Thence it is passed if desired, by a metering pump 14, to a heater 16 where its temperature is raised, advantageously to about 80 to 100° C. From the heater it flows into a reaction vessel 18. This vessel is shown in detail in FIG. 2, and consists of a conical vessel whose diameter increases in an upward direction, i.e., in the direction in which the brine flows. If desired, its outer walls may be heated by a heater coil or a jacket 19, and its lower portion forms a settling chamber 20, which as illustrated is also conical. The vessel 18 is provided with a cover 22 which is provided with heater coils 24. Within the vessel there is a scraping and stirring device 26 having a vertical shaft 28 that rotates at moderate speed and scrapes the wall of the reaction vessel and also the wall of the settling chamber. At a short distance beneath the cover the vessel is provided with a large number of apertures 34 through which the purified and ascending liquid passes into the discharge channel 36 outside the casing. The vessel is therefore filled with brine up to the level 35. Brine is supplied to the lower end of the vessel through a feed pipe 38. The pipe can also supply a large number of inlet openings distributed uniformly in the middle of the vessel, or the brine may be supplied by a central pipe entering from above or at a number of places on the outer wall of the vessel. Descending into the liquid from above is a charging tube 40 into which slaked or burnt lime is fed through a pipe 42. The slaked lime is added and regulated by means of a pump. The burnt lime is stored in a silo 44 and is fed in by means of a metering balance 46 at as uniform a rate as possible. At the same time sodium carbonate and sodium sulfate or, if desired, mother liquor, are supplied to the reaction vessel by the metering pump 14 from two other storage tanks 46 and 48. The mother liquor flows in at the lower end of the vessel 18 through a pipe connection 50 or into the center of the vessel through a connection 51. Thus, the mother liquor is supplied to the same vessel and in the same direction as the brine.

Figure 2:
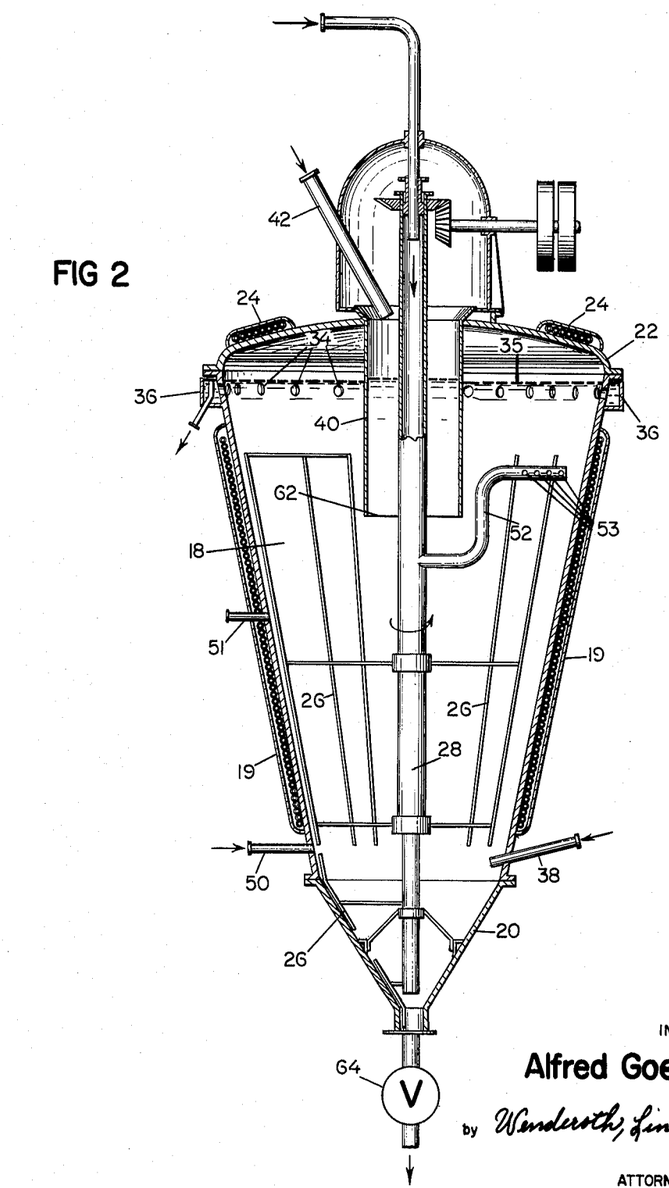
FIG. 2 shows the reaction vessel used in the plant shown in FIG. 1.

The sodium carbonate solution is supplied to the upper part of the vessel through a supply pipe 52 having outlet openings 53 at a higher level than that of the bottom opening 62 of the tube 40, through which the burnt or slaked lime is fed in. The sodium carbonate solution is therefore supplied higher up, or after the lime in relation to the direction of flow of the brine. On the other hand, the mother liquor, if such is supplied, flows in before the sodium carbonate solution. The purified brine that flows out through the channel 36 is passed first into an intermediate reservoir 54 and is then pumped by a pump 56 through two filters 58, which work alternately, into a storage tank 60 where it is stored for further use, for example, for electrolysis or for concentration by evaporation. These filters serve only as an additional precaution and merely remove the very fine particles that may have been entrained.

The process of the invention takes place entirely within the vessel 18. The crude brine, which has been heated in the heater 16, slowly ascends in the vessel and encounters the burnt granular lime or the slaked lime which has entered through the tube 40 and descends in countercurrent. The lime enters the vessel 18 through the lower opening 62 of the tube 40, spreads out while descending and slowly dissolves. The percentage particle size distribution of the lime is so chosen that it will not dissolve completely until it has reached approximately the level of the inlet pipe 38 for the crude brine. This slow dissolution of the reagent uniformly over the width of the stream of brine flowing in countercurrent that takes place between the lower opening 62 and the supply pipe 38 results in an increase in the pH value of the brine from about 7, which it has on entering through the pipe 38, to at least 10.0 at the outlet 62 of the tube 40. At the same time, however, there is still enough reagent left at the position of the pipe 38, where the brine still has a pH value of about 7, to cause the precipitation of magnesium ions there. This precipitation is assisted by the sludge that has already been precipitated, and at least a part of which is maintained in contact with the flowing brine. To ensure this the brine is caused to flow through a part of the settling chamber, that is to say, through a part of the space in which settling sludge is present in sufficient quantity and of adequate particle size. The sludge is thus kept in suspension in the lower portion of the reaction zone or at the upper extremity of the settling zone by the stirring or by the inflowing brine. The presence of this suspended sludge is essential for carrying out the process. The details of the phenomena that takes place at this stage have not yet been fully investigated, but it is essential that particles of adequate size and in sufficient quantity should be present in order to secure the formation of sludge that settles satisfactorily and is sufficiently solid. This can be achieved more especially by suitably controlling the withdrawal of sludge and hence the level of sludge in the reaction vessel. When the process is started, for example, after the reaction vessel has been cleaned, care must be taken that sufficient sludge is present in the reaction zone from the outset. Due to contact between the brine and the precipitated sludge there is a continuous union of the precipitated magnesium hydroxide and calcium sulfate particles to form larger particles which settle relatively rapidly and collect in the lower cone 20. At its lower end the cone 20 is provided with a discharge device 64 through which the deposited material can be removed. If desired, the impurities collecting in the lower cone can be rinsed with water directed upwardly from below in order to recover the brine retained therein. For that purpose the settling cone may be extended downwardly by a cylindrical extension, in which the sludge sliding downwards is washed by a stream of water flowing upwards. If desired, intimate contact between the sludge and washing water may be assisted by the provision of an additional stirring device, which is advantageously rotated more rapidly than the stirring device in the reaction vessel.

As mentioned above, the whole purification process takes place within the vessel 18, which accommodates both reaction zones. The first reaction zone, in which the reaction with the added lime takes place, extends approximately from the point of entry of the brine through the pipe 38 to the lower opening 62 of the tube 40. The second reaction zone is situated above the first one and extends from about the level of the supply pipe 52 to the outlet for the brine from the vessel through the openings 34. It will be understood that there is no sharp separation between but it is important that the entrance of precipitated sludge formed in the first zone into the region of the second zone should be avoided as far as possible. This can be ensured by suitably adjusting the velocity of flow of the brine and regulating the rate of removal of the sludge through the valve 64.

It will be seen that the brine is purified to an extent to which it ascends in the vessel and is freed from the precipitated material. Due to the fact that a descending flow of smaller and larger particles of the granular lime continuously passes through the brine, the precipitated material comes into contact with descending particles as soon as it is formed, so that it combines with the descending particles to form larger agglomerates. By appropriately adjusting the velocity of ascent of the brine and the quantity and particle size of the added reagent relatively to one another substantially all the magnesium is precipitated at about the level of the opening 62, and not later than the level of the supply pipe 52. Specimens of liquid withdrawn at various levels of the vessel show that above the level of the supply pipe 52, that is to say, in the second reaction zone, substantially no turbidity remains. The stirring device 28 rotates extremely slowly at the rate of about one revolution in ½ to 2 minutes, and its purpose is mainly to remove and stir any particles that adhere to the wall of the vessel 18.

Thus, lime in granular form or slaked lime is added to the brine in the apparatus shown in the drawing, and the ascending brine is given a velocity lower than that of the descending precipitated impurities, so that no sludge is carried out of the reaction zone. The particle size of the lime is advantageously so chosen that it dissolves slowly in the heated brine in the region of the countercurrent flow and is distributed as uniformly as possible so that the pH value increases uniformly from about 7.0 to at least 10.0 within the first zone. The velocity of flow of the brine, the withdrawal of sludge from the settling chamber and the stirring or the partial upwards flow of the settling precipitated sludge by the inflow of brine are so adjusted relatively to one another that a suspension of at least 10 to 60% by volume of sludge remains in the reaction zone, so that the brine comes in contact with descending solid particles at all parts of the region of the countercurrent flow. The result is probably that the precipitated materials combine to form larger particles that descend rapidly. Thus, the brine ascends through a region in which the precipitation is probably accompanied by a mechanical increase in weight such that the precipitated materials settle more rapidly and collect on the floor of the vessel, while the ascending brine leaves the region of countercurrent flow substantially free from turbidity. This process is assisted by the fact that the vertical vessel widens in cross-section from the bottom to the top, that is to say, in the direction in which the brine is travelling, and consequently the velocity of the brine decreases as it ascends.

Due to the conical shape of the precipitation vessel and the consequent reduction in the velocity of the brine as it ascends, the descending sludge is subjected to a sifting action due to which the smallest particles are maintained in suspension until they have grown in size sufficiently, and only the coarser particles reach the settling chamber. In addition the change in the velocity of flow can be used to determine the upper limit to which the particles rise. This results in the discharge from the reaction vessel of a brine which is free from suspended particles. The clarifying filters 58 through which the brine flows serve principally as a precautionary measure. It has been found that the clarifying filters can be kept in operation for up to one month without requiring to be cleaned.

Figure 3:
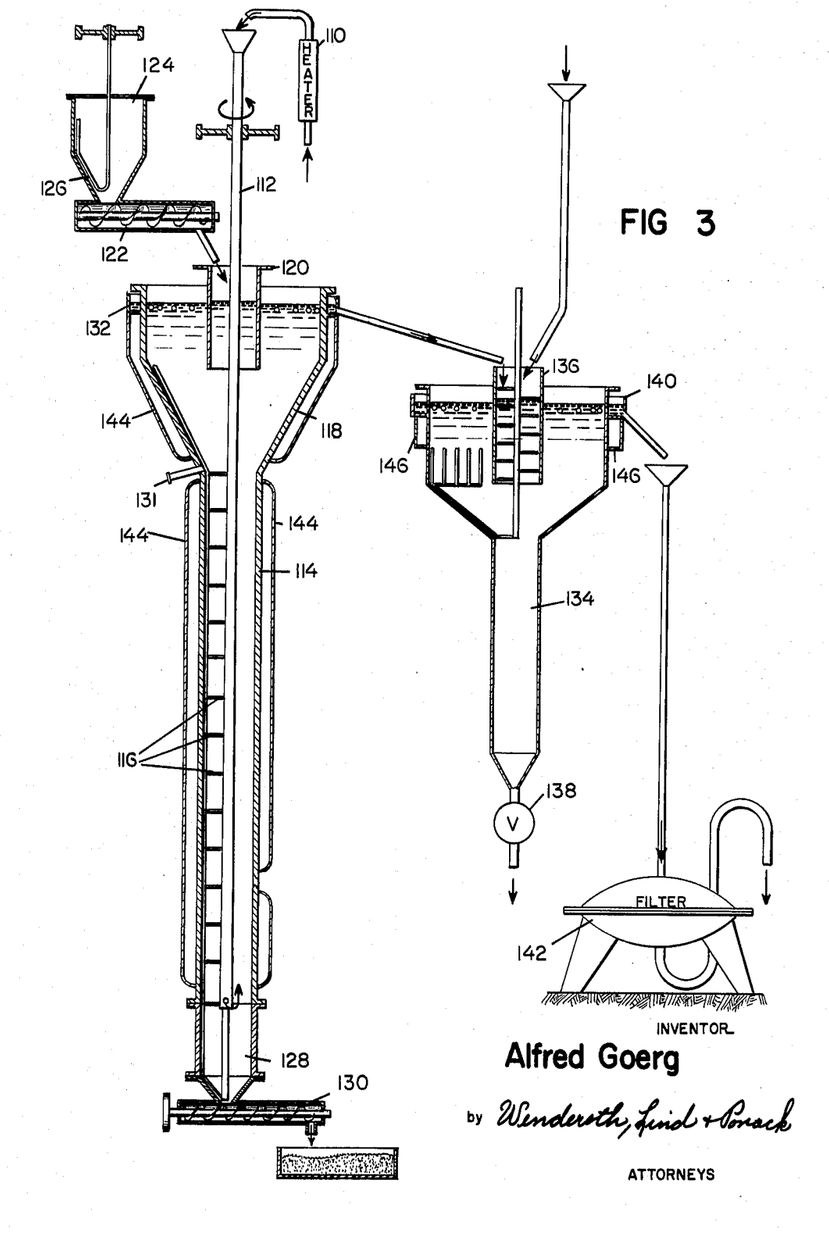
FIG. 3 shows another arrangement in which two separate reaction vessels one for the first reaction zone and the other for the second are used.

FIG. 3 shows another apparatus in which the two stages of the process, namely the precipitation of the magnesium and the removal of the calcium, are carried out in two separate vessels. This form of the process is especially advantageous when cleaned flue gases ($CO_2$) are available. In this case there may be interposed between the first and the second reaction zones an absorption apparatus which the caustic soda formed in the first zone in accordance with reaction 4 is converted into sodium carbonate in accordance with reaction 5a.

In this manner the consumption of the latter rather expensive reagent in the second zone is reduced. Thus, each of the two separate reaction vessels constitutes one of the two reaction zones. The crude brine is heated in a heater 110 and is then passed through a central pipe 112 to the lower part of a long vertical cylindrical vessel 114. The supply pipe is rotatably mounted and rotates the stirring and scraping device 116. In the upper conically widening portion 118 is provided with a tube 120 through which granular burnt lime is supplied by means of a metering screw 122 from a storage container 124 having a stirrer 126. The upper part of the reaction vessel increases in width in the direction in which the brine flows, whereby the settling of the precipitated impurities is facilitated. The lime descends slowly within the reaction vessel 114 so that it reacts slowly, and encounters the ascending brine moving in countercurrent. As described above, this results in the complete precipitation of the magnesium and the calcium sulfate in a form which descends rapidly. The descending particles collect in the lower portion 128 and are discharged by means of a screw 130. If sodium sulfate solution or mother liquor is to be added, it is supplied through an inlet 131. The partially purified brine that issues from a channel 132 passes into the second reaction vessel 134, where it is mixed in an inlet tube 136 with sodium carbonate solution. If flue gases are available, they can be introduced into a suitable device, for example, an absorber, located immediately in front of the entrance to the inlet tube 136, in order to bring the hydroxyl concentration of the brine back to $10^{-6}$. The precipitated compounds containing calcium collect in the lower portion of the vessel 134 whose sole function is to cause satisfactory settling of the sludge, and these compounds can be discharged through a valve 138, while at the same time the brine, which is now completely purified, is discharged through a discharge channel 140, and then passes through a precautionary filter 142 where it is freed from any small solid particles that have been entrained. The vessels 114 and 118 and also the upper part of the vessel 134 are provided with heating jackets 144 and 146, respectively, in order to maintain the brine at a sufficiently high temperature during the precipitation process.

The following examples give the results of experiments that were carried out with the apparatus shown in the drawings.

In the apparatus shown in FIGS. 1 and 2 all the reactions represented by Equations 1 to 5, and in some cases 6, take place in the vessel 18, and in the apparatus shown in FIG. 3 only the reactions represented by Equations 1 and 2, and in some cases 4 and 6, take place in the vessel 118, the other reactions taking place in the vessel 136.

*Example 1*

The purified brine was to be used for electrolysis in diaphragm cells. For this reason no sodium sulfate solution or mother liquor was added. The heat contained in the purified brine was used to raise the temperature of the crude brine by means of a heat exchanger.

The heated reaction vessel used to carry out the process was that shown in FIG. 2, and it had the following dimension:

| | |
|---|---|
| Diameter at upper rim | 2.93 meters. |
| Diameter at level of brine supply pipe 38 | 1.70 meters. |
| Height of overflow openings 34 above brine inlet 38 | 3.82 meters. |
| Distance of opening 62 from openings 34 | 1.15 meters. |
| Distance of distributor pipe 52 from overflow openings 34 | 0.4 meter. |
| Height of settling chamber 20 | 1.34 meters. |
| Total volume including settling chamber | 17 cubic meters. |
| Rate of revolution of the stirring device | 1.2 revolutions per minute. |
| Surface area of clarifying filter | 10 square meters. |

The crude brine to be purified had a pH value of 7.2 and the following average analysis:

| | Grams per liter |
|---|---|
| NaCl, approximately | 305 |
| $SO_4$ | 5.8 |
| $Ca^{++}$ | 1.0 |
| $Mg^{++}$ | 1.8 |

The temperature of the crude brine was between 82 and 88° C., and that of the issuing purified brine was between 87 and 93° C. The experiment lasted for a total of 560 hours. During this time the throughput of crude brine was 2745 liters per hour. The burnt and ground lime was added at an average rate of 5.1 kg. per cubic meter of crude brine. There were also added, per cubic meter of crude brine, 5.5 kg. of sodium carbonate and 1.0 kg. of sodium bicarbonate in the form of a solution containing 115 g. of $NaCO_3$ and 22 g. of $NaHCO_3$ per liter. The purified brine discharged from the apparatus had a density of 1.189 to 1.191 at 20° C., corresponding to a sodium chloride content of 298 to 301 grams per liter. During the experiment there was obtained an average of 2815 liters of purified brine per hour. Analysis of the purified brine gave the following mean values:

|  | Grams per liter |
|---|---|
| $Na_2SO_4$ | 3.10 |
| NaCH | 0.10 |
| $Na_2CO_3$ | 0.70 |
| Mg | trace |
| Ca | trace |

The average yield of settled sludge was 32 kg. per cubic meter of crude brine. The unwashed sludge had a water content of 33 to 39% and a sodium chloride content of 11 to 13%. This content of sodium chloride represents a loss of 1.1 to 1.4% of sodium chloride calculated on the sodium chloride content of the crude brine. As slated in the foregoing description, the greater part of the salt contained in the sludge can be recovered by washing it. During the experiment test portions of the liquid were withdrawn at various levels of the reaction vessel, and their pH value and sludge content were determined. The test portions were withdrawn through openings in the side of the vessel at heights above the inlets for the brine of (I) 0.83 meter; (II) 1.25 meters; (III) 1.80 meters; (IV) 2.45 meters, and (V) 2.98 meters. The last mentioned opening was therefore located in the region between the first and the second zones, and all the other were in the first zone. The test portions gave the following mean values, the percentages by volume of the sludge being measured in a test vessel after a settling time of 1 hour:

| Test portion | pH Value (found with Indicator paper) | Sludge Content |
|---|---|---|
| I | 7 to 8 | Not determined. |
| II | 8 to 9 | 33 to 44% by vol. |
| III | 9 to 10 | 36 to 42% by vol. |
| IV | Approx. 11.0 | 34 to 40% by vol. |
| V | Approx. 11.0 | Practically nil. |

These tests show that the brine to be purified and precipitated sludge were in contact with each other in the first zone, whereas in the second zone practically no sludge was present. At the same time the lower the position from which the specimens were taken, the firmer was the sludge at a given percentage volume, so that there is an increase in particle size in a downward direction.

Throughout the whole test, it was necessary to change the clarifying filter only twice.

*Example 2*

The brine to be purified was to be used as feed in an evaporation plant. For this reason mother liquor was added. The crude brine had the following analysis:

| | |
|---|---|
| Specific gravity | 1.200. |
| pH Value | 7.0. |
| NaCl | 307 grams per liter. |
| $Fe_2O_3+Cl_2O_3$ | Trace. |
| $Ca^{++}$ | 1.0 gram per liter. |
| $Mg^{++}$ | 1.7 grams per liter. |
| $SO_4^{\circ\circ}$ | 6.2 grams per liter. |

The purified brine was passed into an intermediate reservoir from which it was fed to the discontinuously operating evaporator. The salt separated in the evaporator was centrifuged to remove the mother liquor adhering to it. For technical reasons the process of purifying the brine had to be interrupted at intervals about every 24 hours. Between these intervals the process was continuous, but had to be started slowly, which required about 6 hours, until the maximum velocity of flow of the raw brine (in the present example 3.75 cubic meters per hour) was attained. The figures given below are mean values for the whole period, including the starting period.

For this example a reaction vessel similar to that described in Example 1 was used.

The speed of the stirring device was 0.7 revolution per minute. During the experiment the inlet temperature of the brine was between 81 and 88° C. and the temperature of the issuing purified brine was between 81 and 83° C. During a test period of 21.5 hours, 77.5 cubic meters (corresponding to an average of 3.6 cubic meters per hour) were passed through. The following substances were consumed:

| | |
|---|---|
| Mother liquor | Average 24.4 cubic meters=1.13 cubic meters per hour. |
| CaO, ground | Average 420 kg.=5.4 kg./per cubic meter of crude brine. |
| $Na_2CO_3$ (contained some $NaHCO_3$) | Average 294 lcg.=3.8 kg./per cubic meter of crude brine. |
| $NaHCO_3$ | Average 50 kg.=0.65 kg./per cubic meter of crude brine. |

The mother liquor added had the following analysis:

| | |
|---|---|
| Specific gravity | 1.197 grams per cc. |
| $Na_2SO_4$ | 31.2 grams per liter. |
| $Na_2CO_3$ | 0.85 gram per liter. |
| NaOH | 1.20 grams per liter. |
| NaCl, approx. | 275 grams per liter. |

CaO analysis and particle size.
The ground burnt lime contained approximately 96% of CaO and had the following particle size distribution:

| Retained by German Standard DIN Sieve No. | Internal diameter of mesh | |
|---|---|---|
| | Mm. | Percent |
| 5 | 1.2 | 0.2 |
| 16 | 0.4 | 3.0 |
| 30 | 0.2 | 16.7 |
| 60 | 0.1 | 26.6 |
| 100 | 0.06 | 13.7 |
| Passed through 100 | 0.06 | 39.7 |

The sodium carbonate solution added contained 74.7 grams per liter of sodium carbonate and 14.3 grams per liter of sodium bicarbonate. 97 cubic meters of purified brine were obtained at the rate of 4.5 cubic meters per hour, having the following mean composition:

| | |
|---|---|
| Specific gravity | 1.193 grams per cc. (1.192 to 1.194). |
| NaCl | 304 grams per liter (302 to 306). |
| $Na_2SO_4$ | 8.5 grams per liter (8.05 to 9.45). |
| $Na_2CO_3$ | 0.29 grams per liter (0.11 to 0.39). |
| NaOH | 0.30 grams per liter (0.18 to 0.56). |

The values shown in brackets show the limits in the variation of test portions taken every 2 hours. The sludge taken from the reaction vessel had the following mean composition:

| | |
|---|---|
| $H_2O$ | 30.5% (dried at 130° C.). |
| NaCl | 18.4%. |

This content of salt corresponds to a loss of about 1% of the salt supplied in the crude brine.

When test portions were taken from the reaction vessel, the proportion of sludge at the openings I to IV was 26 to 38% by volume, and practically nil at the opening V. After the starting period, the pH value at the level of I and II was between 7 and 9, at the level of III between 8 and 10 and at the level of IV and V above 10.

To check the purity of the salt obtained from the evaporator, test portions of salt were taken at intervals of 2 hours from the output of the drying centrifuge. Over the whole duration of the experiment these test portions had the following maximum content of impurities:

$Na_2SO_4$ ______________ 0.036% (minimum 0.025%).
$Na_2CO_3$ ______________ 0.006% (minimum 0.003%).
NaOH ______________ Less than 0.0004%.
$H_2O$ ______________ 2 to 3% (dried at 120° C.).

In spite of the increase in the sodium sulfate content of the mother liquor in the evaporator throughout the process, the sodium sulfate content of the centrifuged salt did not increase.

After a period of 3100 operating hours and a total output of about 3000 tons of salt the evaporator was opened, and no deposits or settlements were found on the evaporator tubes. This shows that the purified brine fed to the evaporator did not contain any undesirable impurities.

*Example 3*

The following experiment was carried out in a small semiindustrial experimental apparatus of the kind shown diagrammatically in FIG. 3. The dimensions were as follows—

(a) Vessel 118 for the first precipitation:
  Total height from 130 to the brine outlet
    opening ______________________meters__ 3.50
  Diameter at the level of the brine outlet openings ____________________________meters__ 0.45
  Diameter of cylindrical portion 114 ___do____ 0.15
  Distance from point of inlet to point of outlet
    of brine ____________________________meters__ 2.85
  Diameter of CaO inlet tube 120 ______do____ 0.15
  Depth of 120 below brine surface ____do____ 0.45

(b) Vessel 134 for the second precipitation:
  Total height from 138 to the level of the
    brine ________________________________meters__ 2.40
  Diameter at the level of the brine outlet open
    ings ________________________________meters__ 0.45
  Height of cylindrical portion ________do____ 1.45
  Diameter of cylindrical portion ______do____ 0.45
  Height from the level of brine to bottom of
    the cone ____________________________meters__ 0.95
  Diameter of inlet tube 136 __________do____ 0.16
  Depth of inlet tube 136 below the brine surface ______________________________meters__ 0.35

(c) Precautionary filter 142:
  Surface ____________________square meter__ 1
  Speed of rotation of both stirrers
    rev. per min__ 0.65

In this test the suitability of the process for the purification of brines that are very rich in $Mg^{++}$ content was tested. For this purpose the crude brine was mixed with a concentrated solution of magnesium chloride until it had a content of about 3.2 grams per liter of $Mg^{++}$ ($Ca^{++}$=1 gram per liter: $SO_4$=6.5 grams per liter).

Duration of test __________________ 81 hours.
Brine temperature at inlet (114) bottom __ 74 to 77° C.
Brine temperature at outlet (118) surface _ 73 to 78° C.
Brine temperature at outlet (134) surface ________________________________ 63 to 65° C.
Feed: Crude brine+$MgCl_2$ solution _____ 4,230 liters.
Mean rate of flow __________________ 52 liters per hour.

Consumption:
  $Na_2SO_4$ (dissolved in part of
    the raw brine) __________ 4.3 grams per liter of crude brine.
  CaO ground (approx. 90%
    CaO) __________________ 10.2 grams per liter of crude brine.
  $Na_2CO_3$ (as solution of 180
    grams per liter) ________ 10.5 grams per liter of crude brine.
Obtained:
  Cleaned brine ______________ 4,350 liters (~54 liters per hour).
  $Na_2SO_4$ content approx. ______ 3.5 grams per liter.
  $Na_2CO_3$ content rather variable, generally about 1 gram per liter.
  pH value greater than 11.
  Sludge from the first reaction
    vessel __________________ 93 kg.=22 grams per liter of crude brine.
  Sludge from the second reaction vessel ______________ 105 kg.=25 grams per liter of crude brine.

The pH value of the brine in the upper part of the first precipitation vessel 118 was maintained above 10 by regulating of the addition of CaO.

The suspended layer of sludge in this vessel remained most of the time at a height of between 3 and 10 cm. below the surface of the brine; only 3 times during the 81 hours was it at a greater height (not more than for 1 to 2 hours), and the brine entering the second vessel was slightly cloudy.

In the second precipitation vessel the sludge layer remained most of the time at a height between 15 and 20 cm. below the surface of the brine. When it reached a greater height, it could easily be lowered by adjusting the removal of sludge, so that the cleaned brine discharged from the apparatus was never cloudy.

The precautionary filter did not have to be cleaned at all during the experiment.

*Example 4*

I.—*Apparatus:*

There was used a purifying apparatus as for Examples 1 and 2 and the mother liquor was introduced through inlet pipe 51. Instead of being prepared directly in a tank, the $Na_2CO_3$—$NaHCO_3$ mixture is prepared by passing separate doses of the two solutions into a pipe system leading to the distributor 53. During this experiment the lime-milk, which had been prepared and kept in suspension in a container, was pumped in directly by means of a small pump into the central pipe 40.

II.—*Operating conditions:*

(1) Speed of stirrer in the purifying apparatus __________ 1.2 r.p.m.
(2) Temperature of the crude
  brine when introduced ____ 82–88° C. (tolerance 78–90° C.)
(3) Temperature of the purified brine on leaving the apparatus ________________ 83–86° C. (tolerance 79–90° C.)
(4) Level of sludge in suspension in the apparatus above
  the inlet for the crude
  brine __________________ ~2.45 m.

The concentration of the sludge is 0–15% by volume, and the pH remained >11.

1.65 m. above the inlet for the crude brine the concentration has remained between 15 and 25% by volume and the pH between 8 and 11.

0.85 m. above the inlet the pH fluctuated between 7 and 9.

The analyses of the solutions used were as follows:

(1) Crude brine:                         Grams per liter     NaCl ------------------------------------- 305
    $SO_4^{--}$ -------------------------------- 5.8
    $Ca^{++}$ -------------------------------- 1.1
    $Mg^{++}$ -------------------------------- 2.3
    $Fe_2O_3 + Al_2O_3$ ---------------------- traces (2) Mother liquor:
    $d = \sim 1.23$.
    $Na_2SO_4$ ----------------------g./l-- 35–42
    $Na_2CO_3$ ----------------------g./l-- 2.5–4
    NaOH -----------------------g./l-- 0.35–0.75

(3) $Na_2CO_3$ solution:
    $Na_2CO_3$ ----------------------g./l-- 110–115
    $NaHCO_3$ ----------------------g./l-- 8–12

(4) $NaHCO_3$ solution:
    $Na_2CO_3$ ----------------------g./l-- 1–4
    $NaHCO_3$ ----------------------g./l-- $\sim 95$ That of the resulting purified brine was:
$d_{15}^4 = \sim 1.19$.

$Na_2SO_4$-------------------- 7.5–9 grams per liter.
$Na_2CO_3$-------------------- 0.4–0.9 gram per liter.
NaOH--------------------------- 0.05–0.20 gram per liter.
$Ca^{++}$, traces; $Mg^{++}$, not detectable by adding NaOH.

III.—*Experiment No. 1:*

Duration --------------------------hours-- 11.5
    Draft of crude brine -------------cu.m./h-- 3.6
        Total ------------------------cu.m-- 41
    Draft of mother liquor-----------cu.m./h-- 0.85

During the experiment 175 kg. of ground quicklime were slaked with water, then added to 550 l. of purified brine and introduced by a pump as described.

The consumption thus amounted, calculated per cu.m. of crude lime, to 4.25 kg. of commercial CaO, 2.2 kg. of $Na_2CO_3$ and 1.7 kg. of $NaHCO_3$.

IV.—*Experiment No. 2:*

Duration ----------------------------hours-- 50
    Draft of crude brine at outset -----cu.m./h-- 3.2
        At the end ------------------cu.m./h-- 3.8
        Average ---------------------cu.m./h-- 3.44
    Total consumption of crude brine --cu.m./h-- 171.5
    Average draft of mother-liquor ---cu.m./h-- 0.8

During the experiment, 925 kg. of commercial slaked lime were suspended in 5100 l. of purified brine and introduced through central tube 40 according to requirement.

The average consumption thus was calculated per cu.m. of crude brine: 5.4 kg. of $Ca(OH)_2$, 1.7 kg. of $Na_2CO_3$ and 2.05 kg. of $NaHCO_3$.

What is claimed is:

1. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
    (1) continuously adding to the upward-flowing brine, in a first reaction zone and at a temperature between 50 and 100° C., lime in counter current flow.
    (2) regulating the lime feed rate to maintain the pH value of the brine at at least 10.0, at the place where the brine leaves the first reaction zone,
    (3) regulating the flow velocity of the brine and the removal rate of the sludge to prevent sludge carryover to the succeeding second reaction zone,
    (4) adding, in a second reaction zone, an alkali carbonate in excess of the amount required for purification, and
    (5) regulating the flow velocity of the brine in said second zone to prevent sludge removal therefrom.

2. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
    (1) continuously adding to the upward-flowing brine, in a first reaction zone and at a temperature between 50 and 100° C., lime in counter current flow.
    (2) regulating the lime feed rate to maintain the pH value of the brine at at least 10.0, at the place where the brine leaves the first reaction zone,
    (3) slowly stirring the brine, regulating the flow velocity of the brine and the removal rate of the sludge to prevent sludge carry-over to the succeeding second reaction zone,
    (4) adding, in a second reaction zone, an alkali carbonate in excess of the amount required for purification, and
    (5) regulating the flow velocity of the brine in said second zone to prevent sludge removal therefrom.

3. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
    (1) continuously adding to the upward-flowing brine, in a first reaction zone and at a temperature between 50 and 100° C., lime in counter current flow.
    (2) regulating the lime feed rate to maintain the pH value of the brine at at least 10.0, at the place where the brine leaves the first reaction zone,
    (3) slowly stirring the brine, regulating the flow velocity of the brine and the removal rate of the sludge to prevent sludge carry-over to the succeeding second reaction zone,
    (4) adding in the first reaction zone sodium sulfate,
    (5) adding, in a second reaction zone, an alkali carbonate in excess of the amount required for purification, and
    (6) regulating the flow velocity of the brine in said second zone to prevent sludge removal therefrom.

4. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
    (1) continuously adding to the upward-flowing brine, in a first reaction zone and at a temperature between 50 and 100° C., lime in counter current flow,
    (2) regulating the lime feed rate to maintain the pH value of the brine at at least 10.0, at the place where the brine leaves the first reaction zone,
    (3) slowly stirring the brine, regulating the flow velocity of the brine and the removal rate of the sludge to prevent sludge carry-over to the succeeding second reaction zone, (4) adding in the first reaction zone sodium sulfate containing mother liquor obtained from evaporating purified brine,
(5) adding, in a second reaction zone, an alkali carbonate in excess of the amount required for purification, and
(6) regulating the flow velocity of the brine in said second zone to prevent sludge removal therefrom.

5. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone end at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding, in a second reaction zone, a mixture of sodium carbonate and sodium hydrogen carbonate, in excess of the amount required for purification, and
(5) regulating the flow velocity of the brine in said second zone to prevent sludge removal therefrom.

6. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone and at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding, in a second reaction zone, carbon dioxide and then sodium carbonate, in excess of the amount required for purification, and
(5) regulating the flow velocity of the brine in said second zone to prevent sludge removal therefrom.

7. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone and at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding in the first reaction zone sodium sulfate,
(5) adding, in a second reaction zone, a mixture of sodium carbonate and sodium hydrogen carbonate, in excess of the amount required for purification, and
(6) regulating the flow velocity of the brine in said second zone to prevent sludge removal therefrom.

8. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone and at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding in the first reaction zone sodium sulfate,
(5) adding, in a second reaction zone, carbon dioxide and then sodium carbonate, in excess of the amount required for purification, and
(6) regulating the flow velocity of the brine in said second zone to prevent sludge removal therefrom.

9. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone and at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding in the first reaction zone sodium sulfate containing mother liquor obtained from evaporating purified brine,
(5) adding, in a second reaction zone, a mixture of sodium carbonate and sodium hydrogen carbonate, in excess of the amount required for purification, and
(6) regulating the flow velocity of the brine in said second zone to prevent sludge removal therefrom.

10. In a process for continuously purifying brine in a two-step process by consecutively adding lime and an alkali carbonate to continuously upward-flowing brine, whereby sludge formation occurs, the velocity of the brine which flows upward through the first reaction zone decreasing on account of the cross-section of the brine which widens upwardly, the addition of the brine occurring where sludge commences to settle out, the steps of
(1) continuously adding to the upward-flowing brine, in a first reaction zone and at a temperature between 50 and 100° C., lime in counter current flow,
(2) regulating the lime feed rate to maintain the pH value of the brine at at least 10.0, at the place where the brine leaves the first reaction zone,
(3) slowly stirring the brine, regulating the flow velocity of the brine and the removal rate of the sludge to prevent sludge carry-over to the succeeding second reaction zone,
(4) adding in the first reaction zone sodium sulfate containing mother liquor obtained from evaporating purified brine, (5) adding, in a second reaction zone, carbon dioxide and then sodium carbonate, in excess of the amount required for purification, and
(6) regulating the flow velocity of the brine in said second zone to prevent sludge removal therefrom.

References Cited by the Examiner

UNITED STATES PATENTS

| | | | |
|---|---|---|---|
| 2,624,654 | 1/1953 | Hirsch | 23—42 |
| 2,686,110 | 8/1954 | Carver | 23—285 |
| 2,764,472 | 9/1956 | Cady et al. | 23—42 |
| 2,917,372 | 12/1959 | Wallin | 23—285 |

FOREIGN PATENTS 588,902  12/1959  Canada.

OSCAR R. VERTIZ, *Primary Examiner.*

MAURICE A. BRINDISI, *Examiner.*

G. OZAKI, *Assistant Examiner.*